(12) United States Patent
Wang et al.

(10) Patent No.: US 6,767,961 B1
(45) Date of Patent: Jul. 27, 2004

(54) BLENDS OF POLY (VINYL ALCOHOL) AND POLY (ETHYLENE OXIDE) AND ARTICLES MADE THEREWITH

(75) Inventors: James Hongxue Wang, Appleton, WI (US); David Michael Schertz, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/599,079

(22) Filed: Jun. 19, 2000

(51) Int. Cl.⁷ .............................................. C08L 29/04
(52) U.S. Cl. ..................... 525/58; 428/364; 428/500; 428/522; 524/503
(58) Field of Search ................................ 524/503, 504; 525/58; 428/364, 500, 522; 604/358

(56) References Cited

U.S. PATENT DOCUMENTS

| | | | |
|---|---|---|---|
| 3,891,584 A | * 6/1975 | Ray-Chaudhuri et al. | 260/27 R |
| 3,984,494 A | * 10/1976 | Harreus et al. | 260/874 |
| 3,996,181 A | 12/1976 | Hayashi et al. | |
| 4,140,668 A | * 2/1979 | Sumi et al. | 260/33.2 R |
| 4,206,101 A | * 6/1980 | Wysong | 260/23 R |
| 4,215,169 A | * 7/1980 | Wysong | 428/220 |
| 4,229,334 A | 10/1980 | Klabacka et al. | |
| 4,284,671 A | 8/1981 | Cancio et al. | |
| 4,620,999 A | 11/1986 | Holmes | |
| 4,631,215 A | * 12/1986 | Welygan et al. | 428/105 |
| 4,826,493 A | 5/1989 | Martini et al. | |
| 4,933,182 A | 6/1990 | Higashi et al. | |
| 5,206,278 A | * 4/1993 | Famili et al. | 524/377 |
| 5,342,659 A | 8/1994 | Horowitz et al. | |
| 5,422,387 A | 6/1995 | Toms et al. | |
| 5,430,090 A | * 7/1995 | Miyamoto et al. | 524/320 |
| 5,508,101 A | 4/1996 | Patnode et al. | |
| 5,567,510 A | 10/1996 | Patnode et al. | |
| 5,583,187 A | 12/1996 | Sharak et al. | |
| 5,641,562 A | * 6/1997 | Larson et al. | 525/57 X |
| 5,658,977 A | 8/1997 | Yang et al. | |
| 5,700,872 A | 12/1997 | Wang et al. | |
| 5,981,012 A | * 11/1999 | Pomplun et al. | 428/41.8 |
| 6,258,427 B1 | * 7/2001 | Kerins et al. | 428/41.8 |

FOREIGN PATENT DOCUMENTS

| | | |
|---|---|---|
| EP | 0210754 | 2/1987 |
| EP | 241178 | 10/1987 |
| EP | 0612773 | 8/1994 |
| EP | 0654504 | 4/1995 |
| EP | 0705934 | 4/1996 |
| EP | 0 792 916 | 9/1997 |
| JP | 51077632 A * | 7/1976 |
| JP | 58-67766 | 4/1983 |
| JP | 61-181869 | 8/1986 |
| JP | 6-142127 | 5/1994 |
| WO | WO 92/04412 | 3/1992 |
| WO | WO 94/10257 | 5/1994 |
| WO | wo 96/20738 | 7/1996 |

OTHER PUBLICATIONS

Ikejima, T., et al., Infrared Analysis on Blends of Poly (3–Hydrooxybutyric Acid) and Stereoregular Poly (Vinyl Alcohol): Influence of Tecticity of Poly (Vinyl Alcohol) on Crystallization of Poly (3–Hydroxybutyric Acid), *Macromolecular Chemistry and Physics*, vol.:197(3), pp.: 869–88, Mar. 1, 1996.

Williams et al., Biodegradable Plastics from Plants, *Chemtech*, pp.: 38–44, Sep. 1, 1996.

Derwent Publications Ltd., Database WPI, JP 08 212995 (Misubishi Paper Mills Ltd.), Aug. 20, 1996.

Derwent Publications Ltd., Database WPI, JP 01 246411 (Sawashita A), Oct. 2, 1989, Oct. 2, 1989.

* cited by examiner

*Primary Examiner*—Judy M. Reddick
(74) *Attorney, Agent, or Firm*—Brinks Hofer Gilson & Lione; G. Peter Nichols

(57) ABSTRACT

The present invention discloses water-soluble compositions comprising a blend of poly(ethylene oxide) and poly(vinyl alcohol) that have improved ductility over water-soluble compositions comprising poly(vinyl alcohol) alone. In one desirable embodiment of the present invention, the poly (ethylene oxide) component of the blend is grafted. Grafted poly(ethylene oxide) resins have improved processability and improved blend compatibility with poly(vinyl alcohol). Films comprising a melt blend of poly(vinyl alcohol) and grafted poly(ethylene oxide) have improved melt processability as well as other improved properties. Films comprising compositions of the present invention have improved ductility over films comprising poly(vinyl alcohol) alone while retaining much of the high strength and water solubility exhibited by such poly(vinyl alcohol) films.

31 Claims, 3 Drawing Sheets

KPO6 PVOH/PEO 70/30  surface, osmicated, topo images, 230x

KPO6 PVOH/PEO 70/30  surface, osmicated, compo image, 230x

KPO6 PVOH/PEO 70/30 grafted. Surface, osmicated; topo image, 230x

KPO6 PVOH/PEO 70/30 grafted. Surface, osmicated; compo image, 230x

BLENDS OF POLY (VINYL ALCOHOL) AND POLY (ETHYLENE OXIDE) AND ARTICLES MADE THEREWITH

FIELD OF THE INVENTION

The present invention is directed to compositions Ad comprising a blend of poly(ethylene oxide) and poly(vinyl alcohol). More specifically, the present invention relates to poly(ethylene oxide) that is grafted with a vinyl monomer. The poly(vinyl alcohol) and grafted poly(ethylene oxide) blend has improved ductility.

BACKGROUND OF THE INVENTION

Disposable personal care products, such as pantiliners, diapers, tampons, etc., are a great convenience. Such products provide the benefit of one time, sanitary use and are convenient because they are quick and easy to use. However, disposal of such products is a concern due to limited landfill space. Incineration of such products is not desirable because of increasing concerns about air quality and the costs and difficulty associated with separating such products from other non-incineratable articles. Consequently, there is a need for disposable products that can be quickly and conveniently disposed of without disposal in a landfill or incineration.

It has been proposed to dispose of such products in municipal and private sewage systems. Ideally, such products would be flushable and degradable in conventional sewage systems. Products suited for disposal in sewage systems and that can be flushed down conventional toilets are termed "flushable". Disposal by flushing provides the additional benefit of providing a simple, convenient and sanitary means of disposal. Personal care products must have sufficient strength under the environmental conditions in which they will be used and be able to withstand the elevated temperature and humidity conditions encountered during use and storage yet still lose integrity upon contact with water in a toilet. Therefore, a water-disintegratable material having mechanical integrity when dry is desirable.

Due to their water solubility, poly(vinyl alcohol) (hereinafter PVOH) and poly(ethylene oxide) (hereinafter PEO) have potential as component materials for water-disintegratable films, fibers, and flushable products. PEO,

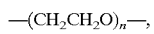

is a commercially available water-soluble polymer that can be produced from the ring opening polymerization of the ethylene oxide,

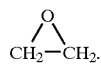

Because of its water-soluble properties, PEO is desirable for flushable applications. However, there is a dilemma in melt processing PEO. Low molecular weight PEO resins have desirable melt viscosities and melt pressure properties for melt processing but have limited solid state properties when melt processed into structural articles, such as films, and high molecular weight PEO has limited processability.

PVOH is also a commercially available waters soluble polymer. PVOH is made by hydrolyzing poly(vinyl acetate). PVOH resins have relatively high strength compared to PEO resins. Advantageously, PVOH resins are available that are both water-soluble and thermoplastic. However, these PVOH resins have low ductility and are inherently brittle. Therefore, there is a need to improve the ductility of water soluble resins, namely PVOH, while still maintaining dry strength and water solubility.

SUMMARY OF THE INVENTION

The present invention discloses completely water-soluble blends of poly(ethylene oxide) (PEO) and grafted-PEO with poly(vinyl alcohol) (PVOH) that do not require plasticizers in order to be thermoplastically processed. Thin films can be made from the blends that have improved properties. PEO, grafted-PEO, and PVOH are all water-soluble polymers. Unmodified PVOH films not containing plasticizers are inherently brittle; i.e., they have low ductility, but they have high strength. The present invention discloses a method of improving the ductility of PVOH films, while retaining strength and water solubility.

Unmodified PEO films have inherently low strength, but have relatively greater ductility than PVOH films. Although PVOH and PEO are both hydrophilic and water-soluble, surprisingly they are not compatible with each other in melt prepared blends despite their similar polarities and water solubilities. Blends of PEO/PVOH do not display blend compatibility. Films made from unmodified PEO and PVOH are visibly hazy and contained many gel particles. The tensile properties of these films are lower in both strength and ductility than PVOH films. Haziness indicates poor compatibility as shown by increased dispersed phase size, which scatters light. The resulting film has reduced tensile properties; i.e., lowered tensile strength.

Grafted-PEO films have inherently high ductility and high tensile strength compared to unmodified PEO films, but have tensile strength significantly lower than the tensile strength of PVOH films. Films comprising a melt blend of grafted-PEO and PVOH have reduced tensile properties; e.g., reduced tensile strength, relative to PVOH films because grafted PEO has much lower tensile strength relative to PVOH but halos have increased strain-at-break. Blends of grafted-PEO/PVOH display excellent blend compatibility, greatly improved compared to unmodified PEO/PVOH blends. Thin films of the grafted-PEO/PVOH blends are much softer than PVOH films. The grafted-PEO/PVOH films have great clarity and do not contain gel particles that are observed for the unmodified PEO/PVOH films. The tensile properties of the grafted-PEO/PVOH films show greater ductility than PVOH films, and greater tensile strength than the grafted-PEO films.

In addition to the above described improvements in overall tensile properties of grafted-PEO/PVOH films, the blend morphology of the grafted-PEO/PVOH was observed and compared to unmodified PEO/PVOH films. The morphology of the grafted-PEO/PVOH films showed greatly improved compatibility between the grafted-PEO and the PVOH, compared to unmodified PEO/PVOH. Films can be made from the blends without the use of or incorporation of any plasticizers or other additives, as commonly observed in the prior art. However, plasticizers and additives can be added to the compositions of the present invention to further improve properties.

These and other features and advantages of the present invention will become apparent after a review of the following detailed description of the disclosed embodiments and the appended drawing and claims.

DETAILED DESCRIPTION OF THE DISCLOSED EMBODIMENTS

Figure 1:
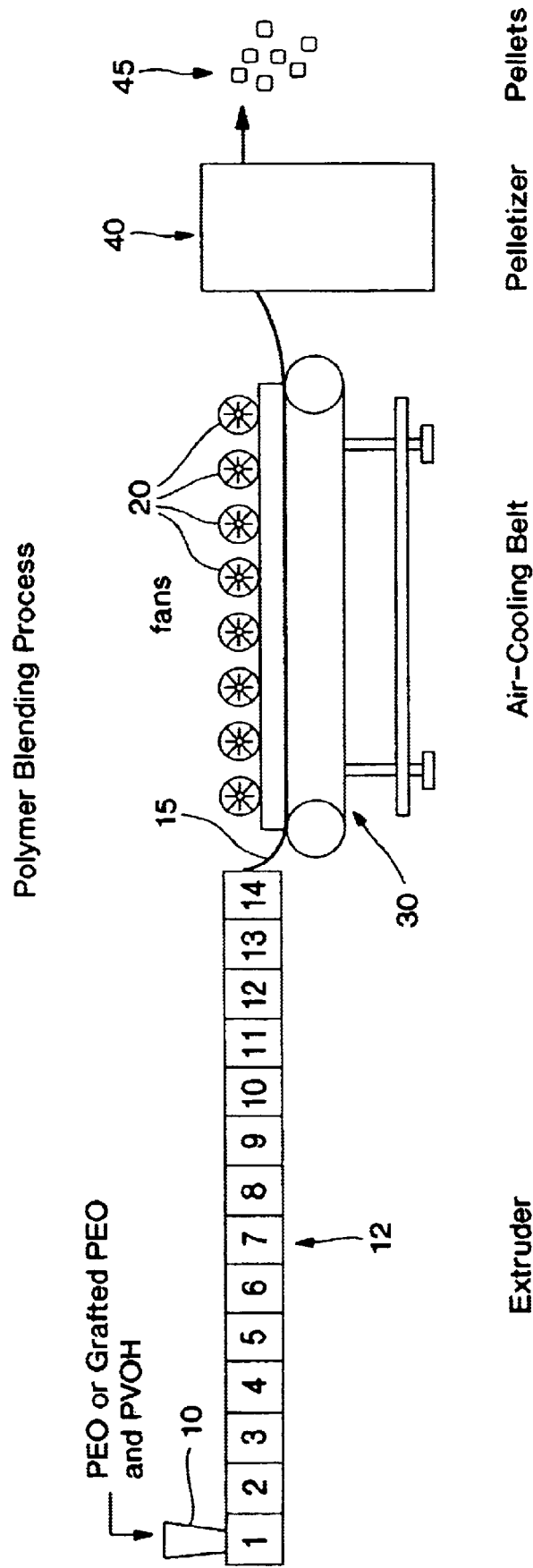
FIG. 1 is a schematic illustration of a polymer blending process.

The present invention discloses a method of improving the ductility of PVOH films and fibers, while retaining strength and water solubility. The present invention discloses completely water-soluble compositions that have improved ductility, high strength, improved processability and other improved properties. The compositions of the present invention comprise a blend of poly(ethylene oxide) (PEO) or grafted-PEO with poly(vinyl alcohol) (PVOH). Films, fibers and other articles comprising the compositions of the present invention have improved properties. Advantageously, thin films, fibers and other articles can be made from the blends more easily.

The compositions of the present invention comprise at least two components, PVOH and PEO and are advantageously thermoplastic and water soluble. The PVOH component of compositions of the present invention is also desirably thermoplastic and water soluble. Polyvinyl alcohol compositions that are both water soluble and thermoplastic are disclosed in U.S. Pat. No. 6,020,425 filed on Jun. 1, 1998, entitled "Unmodified Polyvinyl Alcohol Films and Fibers and Methods of Making the Same," the disclosure of which is incorporated herein by reference. Grades of PVOH resin that are both water soluble and thermoplastic are commercially available. PVOH resins suggested as the PVOH component in the blends of the present invention should have a viscosity of less than about 10 centipoise (cps) in a 4 percent solution at 20° C. as determined by the Hoeppler falling ball method and a hydrolysis level of less than about 90 percent. The degree of hydrolysis of PVOH is defined as the molar percentage of vinyl acetate units in a poly(vinyl acetate) polymer that are hydrolyzed to vinyl alcohol units. Suggested examples of commercially available grades of PVOH resins include, but are not limited to, Elvanol® 51-05, available from DuPont of Wilmington, Del.; Airvol® 203 and Airvol® 205, available from Air Products and Chemical, Inc. of Allentown, Pa.; and Gohsenol KP-06, available from Nippon Gohsei of Osaka, Japan. PVOH resins are typically sold in powder or granule form. Pellets, powders or other forms of PVOH and PEO resins can be used in this invention since the physical form of PVOH does not affect melt processability. The present invention is demonstrated by the use of Gohsenol KP-06 PVOH resin in the Examples below. The Gohsenol KP-06 PVOH resin is cold water soluble and thermoplastic and has an aqueous solution viscosity that ranges from about 5–7 cps at 4 percent concentration and 20° C.

PEO resins useful as the PEO component in the compositions of the present invention can be average molecular weights ranging from about 100,000 g/mol to about 8,000,000 g/mol as measured by the supplier using rheological measurements (which approximates weight average molecular weight). Desirably, the PEO resins should be both thermoplastic and water-soluble. Suggested PEO resins are commercially available from Union Carbide and include, but are not limited, Union Carbide PEO resins sold under the trade designations POLYOX® WSR N-10, POLYOX® WSR N-80, POLYOX® WSR N-750, POLYOX® UCAR-FLOC® Polymer 309, POLYOX® WSR N-205 and POLYOX® WSR N-12K. Other useful PEO resins within the above approximate molecular weight ranges are available from, for example, Union Carbide Corporation, and are sold under the trade designations WSR N-750, WSR N-3000, WSR-3333, WSR-205, WSR-N-12K, WSR-N-60K, WSR-301, WSR Coagulant, WSR-303. (See POLYOX®: Water Soluble Resins, Union Carbide Chemicals & Plastic Company, Inc., 1991 which is incorporated by reference herein in its entirety.) Both PEO powder and pellets of PEO can be used in this invention since the physical form of PEO does not affect its behavior in the melt state for grafting reactions. This invention has been demonstrated by the use of PEO in powder form as supplied by Union Carbide. However, the PEO resins to be modified may be obtained from other suppliers and in other forms, such as pellets. The PEO resins and modified compositions may optionally contain various additives, such as plasticizers, processing aids, rheology modifiers, antioxidants, UV light stabilizers, pigments, colorants, slip additives, antiblock agents, etc., which may be added before or after modification.

Desirably, the PEO resin component of the compositions of the present invention is modified by grafting the PEO to form a graft copolymer of PEO and the grafting monomer. As used herein, the term "graft copolymer" means a copolymer produced by the combination of two or more chains of constitutionally or configurationally different features, one of which serves as a backbone main chain, and at least one of which is bonded at some point(s) along the backbone and constitutes a side chain. As used herein, the term "grafting" means the forming of a polymer by the bonding of side chains or species at some point(s) along the backbone of a parent polymer. (See Sperling, L. H., *Introduction to Physical Polymer Science* 1986 pp. 44–47 which is incorporated by reference herein in its entirety.)

Modification of PEO resins with starting molecular weights of between about 100,000 g/mol to about 8,000,000 g/mol allows the modified PEO resins to be drawn into films with thicknesses of less than 0.5 mil. Modification of PEO resins with starting molecular weights of between about 300,000 g/mol to about 8,000,000 g/mol is preferred for filmmaking. Films thermally processed from the modified PEO compositions have better softness and greater clarity than films processed from unmodified low molecular weight PEO having a reported molecular weight of 200,000 g/mol or less. Thermal processing of films from high molecular weight PEO modified in accordance with this invention also results in films with improved mechanical properties over films similarly processed from unmodified low molecular weight PEO.

A variety of monomers may be useful in the practice of this invention. The term "monomer(s)" as used herein includes monomers, oligomers, polymers, mixtures of monomers, oligomers and/or polymers, and any other reactive chemical species that are capable of covalent bonding with the parent polymer; i.e., PEO. Suggested monomers are ethylenically unsaturated and contain a polar vinyl group.

Such monomers are termed "polar vinyl" herein. A variety of polar vinyl monomers may be useful in the practice of this invention. Monomer as used herein includes monomers, oligomers, polymers, mixtures of monomers, oligomers and/or polymers, and any other reactive chemical species that is capable of covalent bonding with the parent polymer; i.e., An PEO. Methods of grafting PEO compositions, and particularly desirable grafted-PEO compositions are disclosed in U.S. patent application Ser. Nos. 09/001 831 and 09/002,197, now U.S. Pat. Nos. 6,172,177 and 6,117,947, respectively the disclosures of which are herein incorporated in their entirety.

Ethylenically unsaturated monomers containing a polar functional group, such as hydroxyl, carboxyl, amino, carbonyl, halo, thiol, sulfonic, sulfonate, etc., are appropriate for this invention and are desired. Ethylenically unsaturated polar monomers include 2-hydroxyethyl methacrylate (hereinafter HEMA), poly(ethylene glycol) methacrylates (hereinafter PEG-MA) including poly(ethylene glycol) ethyl ether methacrylate, poly(ethylene glycol) acrylates, poly(ethylene glycol) ethyl ether acrylate, poly(ethylene glycol) methacrylates with terminal hydroxyl groups, acrylic acid, maleic anhydride, itaconic acid, sodium acrylate, 3-hydroxypropyl methacrylate, acrylamide, glycidyl methacrylate, 2-bromoethyl acrylate, carboxyethyl acrylate, methacrylic acid, 2-chloroacrylonitrile, 4-chlorophenyl acrylate, 2-cyanoethyl acrylate, glycidyl acrylate, 4-nitrophenyl acrylate, pentabromophenyl, acrylate, poly(propylene glycol) methacrylate, poly(propylene glycol) acrylate, 2-propene-1-sulfonic acid and its sodium salt, sulfo ethyl methacrylate, 3-sulfopropyl methacrylate, and 3-sulfopropyl acrylate.

Desired ethylenically unsaturated monomers include acrylates and methacrylates. Particularly desirable monomers, oligomers, polymers, mixtures of monomers, oligomers and/or polymers, and any other reactive chemical species which is capable of covalent bonding with the parent polymer, PEO, ethylenically unsaturated monomers containing a polar functional group are 2-hydroxyethyl methacrylate (hereinafter HEMA) and poly(ethylene glycol) methacrylates (hereinafter PEG-MA). A particularly desirable poly(ethylene glycol) methacrylate is poly(ethylene glycol) ethyl ether methacrylate. However, it is expected that a wide range of polar vinyl monomers would be capable of imparting similar effects as HEMA and PEG-MA to PEO and would be effective monomers for grafting. For grafting purposes, the amount of polar vinyl monomer relative to the amount of PEO may range from about 0.05 to about 30 weight percent of monomer to the weight of PEO. Desirably, the amount of monomer should exceed 0.1 weight percent to improve the processability of the PEO. A range of grafting levels is demonstrated in the above-incorporated U.S. Patent Applications. Typically, the monomer addition levels are between 2.5 percent and 15 percent of the weight of the base PEO resin. Ethylenically unsaturated monomers containing a polar functional group, such as hydroxyl, carboxyl, amino, carbonyl, halo, thiol, sulfonic, sulfonate, etc., are appropriate for this invention and are desired. Desired ethylenically unsaturated monomers include acrylates and methacrylates. It is expected that a wide range of polar vinyl monomers are capable of imparting similar effects as HEMA and PEG-MA and are effective monomers for grafting. In one embodiment, compositions of the present invention comprise from 1 to 99 weight percent of grafted PEO and from 99 to 1 weight percent of PVOH that is not required to be plasticized or modified in order to be melt processable.

This invention has been demonstrated in the following examples by the use of HEMA as the polar vinyl monomer. The HEMA was obtained from Aldrich Chemical Company and is designated Aldrich Catalog number 12,863-5. The grafted PEO used in the following examples was produced from the reactive extrusion of POLYOX® N-3000, 3.3 weight percent HEMA and 0.16 weight percent LUPERSOL® 101 initiator. PEG-MA is also a suggested monomer and can be obtained from Aldrich Chemical Company. A desirable PEG-MA is poly(ethylene glycol) ethyl ether methacrylate, sold under Aldrich Catalog designation number 40,954-5. Poly(ethylene glycol) ethyl ether methacrylate is a derivative of poly(ethylene methacrylate). The poly(ethylene glycol) ethyl ether methacrylate sold by Aldrich under the above designation number has a number average molecular weight of approximately 246 grams per mol. PEG-MA with a number average molecular weight higher or lower than 246 g/mol is also applicable for this invention. The molecular weight of the PEG-MA can range up to about 50,000 g/mol. However, lower molecular weights are preferred for faster grafting reaction rates. The desired range of the molecular weight of the monomers is from about 246 to about 5,000 g/mol, and the most desired range is from about 246 to about 2,000 g/mol. Again, it is expected that a wide range of polar vinyl monomers as well as a wide range of molecular weights of monomers would be capable of imparting similar effects to PEO resins and blends incorporating such grafted-PEO resins and would be effective monomers for grafting and modification purposes.

A variety of initiators may be useful in the grafting of the PEO. When grafting is achieved by the application of heat and intensive mixing, as in a reactive-extrusion process, it is desirable that the initiator generates free radicals through the application of heat. Such initiators are generally referred to as thermal initiators. For the initiator to function as a useful source of radicals for grafting, the initiator should be commercially and readily available, stable at ambient or refrigerated conditions, and generate radicals at reactive-extrusion temperatures.

Compounds containing an O—O, S—S, or N=N bond may be used as thermal initiators. Compounds containing O—O bonds, peroxides, are commonly used as initiators for polymerization. Such commonly used peroxide initiators include: alkyl, dialkyl, diaryl and arylalkyl peroxides, such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2,5-di(t-butylperoxy)hexane, 2,5-dimethyl-2,5-bis(t-butylperoxy) hexyne-3 and bis(a-t-butyl peroxyisopropylbenzene); acyl peroxides, such as acetyl peroxides and benzoyl peroxides; hydroperoxides, such as cumyl hydroperoxide, t-butyl hydroperoxide, p-methane hydroperoxide, pinane hydroperoxide and cumene hydroperoxide; peresters or peroxyesters, such as t-butyl peroxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; diperoxyketals; ketone peroxides, such as cyclohexanone peroxide and methyl ethyl ketone peroxide. Additionally, azo compounds, such as 2,2'-azobisisobutyronitrile abbreviated as AIBN, 2,2'-azobis(2,4-dimethylpentanenitrile) and 1,1'-azobis(cyclohexanecarbonitrile) may be used as the initiator. This invention has been demonstrated in the following Examples by the use of a liquid, organic peroxide initiator available from Elf Atochem North America, Inc. of Philadelphia, Pa., sold under the trade designation LUPERSOL® 101. LUPERSOL® 101 is a free radical initiator and comprises 2,5-dimethyl-2,5-di(t-butylperoxy) hexane. Other initiators and other grades of LUPERSOL® initiators may also be used, such as LUPERSOL® 130.

A variety of reaction vessels may be useful in the practice of this invention. The modification and blending of the PEO with the PVOH can be performed in any vessel as long as the necessary mixing of PEO, PVOH, monomer and initiator is achieved and enough thermal energy is provided to effect grafting. Desirably, such vessels include any suitable mixing device, such as Brabender Plasticorders, Haake extruders, single or multiple screw extruders, or any other mechanical mixing devices that can be used to mix, compound, process or fabricate polymers. In one embodiment, the reaction and mixing device is a counter-rotating twin-screw extruder, such as a Haake extruder available from Haake, 53 West Century Road, Paramus, N.J. 07652 or a co-rotating, twin-screw extruder, such as a ZSK-30 twin-screw, compounding extruder manufactured by Werner & Pfleiderer Corporation of Ramsey, N.J. It should be noted that a variety of extruders can be used to modify the PEO in accordance with the invention provided that mixing, including dispersive and distributive mixing, and heating occur.

The ZSK-30 extruder allows multiple feeding, has venting ports and is capable of producing modified PEO at a rate of up to about 50 pounds per hour. The ZSK-30 extruder has a pair of co-rotating screws arranged in parallel. The center to center distance between the shafts of the two screws of the ZSK-30 extruder is 26.2 mm. The nominal screw diameters are 30 mm. The actual outer diameters of the screws are 30 mm and the inner screw diameters are 21.3 mm. The thread depths is 4.7 mm. The lengths of the screws are 1328 mm and the total processing section length is 1338 mm. If a higher rate of production of modified PEO is desired, a commercial-scale twin screw extruder of a larger diameter may be used.

This ZSK-30 extruder used in the following examples had 14 processing barrels, which were numbered consecutively 1 to 14 from the feed barrel to the die for the purposes of this disclosure. The first barrel, barrel #1, received the PEO and was not heated but cooled by water. The other thirteen barrels were heated. The grafting monomer, HEMA, was injected into barrel #5 and the initiator was injected into barrel #6. Both the monomer and the initiator were injected via a pressurized nozzle injector, also manufactured by Werner & Pfleiderer. The order in which the PEO, monomer and initiator are added is not critical and the initiator and monomer may be added at the same time or in reverse order. However, the order used in the following examples is desired. The die used to extrude the modified PEO strands had four openings of 3 mm in diameter which were separated by 7 mm. The modified PEO strands were extruded onto an air-cooled belt and then pelletized into solid cylindrical pellets. The extruded PEO melt strands were cooled by air on a fan-cooled conveyor belt 20 feet in length.

Another extruder suitable as the reaction device includes a Haake extruder. The Haake extruder that was used in the following examples was a counter-rotating, twin-screw extruder that contained a pair of custom-made, counter rotating conical screws. The Haake extruder had a length of 300 millimeters. Each conical screw had a diameter of 30 millimeters at the feed port and a diameter of 20 millimeters at the die. The monomer and the initiator can be added at the feed throat of the Haake extruder contemporaneously with the PEO resin.

The Haake extruder comprises six sections as follows: Section 1 comprised a double-flighted forward pumping section having a large screw pitch and high helix angle. Section 2 comprised a double-flighted forward pumping section having a smaller screw pitch than Section 1. Section 3 comprised a double-flighted forward pumping section having a smaller screw pitch than Section 2. Section 4 comprised a double-flighted and notched reverse pumping section where one complete flight was notched. Section 5 comprised a double-flighted and notched forward pumping section containing two complete flights. And, Section 6 comprised a double-flighted forward pumping section having a screw pitch intermediate that of Section 1 and Section 2. For making films the Haake extruder is fitted with a slit film die. Slit film dies are available in both 4 inch and 8 inch widths. A film windup device consisting of a chill roll that is chilled with cool water is also desirable. A film windup device and a motor-driven windup roll were used to collect film samples. Film thickness was and can be controlled by the screw speed, die gap, and film wind up speed.

Polymer Blend Preparation

The polymer blends of the examples were produced by a twin screw extrusion process. It is desired to blend or mix the two components in an extruder, such as a twin-screw extruder or single-screw extruder under appropriate temperature and shear/pressure conditions to ensure complete mixing, including both dispersive and distributive mixing. The blending process can also be performed in a batchwise mixing device, such as a melt mixer or a kneader. The PEO or grafted-PEO component and the PVOH component of the blend composition can be fed into the extruder or other mixing device either simultaneously or in sequence to minimize degradation and discoloration. Compositions of the present invention can be made by grafting the PEO component prior to blending the PEO component with the PVOH component of the composition. In an advantageous embodiment, the PEO can be blended with PVOH and grafted simultaneously to produce a thermoplastic blend not requiring the addition of plasticizers.

A Werner & Pfleiderer ZSK-30 co-rotating, twin-screw extruder was used to blend the PVOH and PEO components of the present invention. The parameters of the ZSK-30 co-rotating, twin-screw extruder are as described above. The first barrel was not heated but cooled by water. The barrel temperatures were set at 180° C. for all of the zones. The screw speed was set at 300 rpm. PEO, or grafted-PEO, and PVOH were added, simultaneously, to the extruder using two separate gravimetric feeders at 6 and 14 lb/hr, respectively. Melt strands were extruded, cooled in air using a fan-cooled conveyor belt, and subsequently pelletized. A schematic diagram of the process of producing blends of the two polymers, PVOH and PEO, is illustrated in FIG. 1. The two polymers can be fed into the hopper 10 of an extruder 12 simultaneously as illustrated or separately to form a blend of the polymers. The PEO can be grafted or otherwise modified before or during the blending process. One of the two polymers or additional polymers, monomers, initiators and/or other additives can be added during the extrusion process at the hopper 10 or injected in a zone further down the extruder. The polymer formulation is melt blended within the extruder and is extruded out of a die to produce strands of the blended polymers. The strands 15 can then be cooled by fans 20 on an air-cooling belt 30. The cooled strands of the blended polymers may then be chopped in a pelletizer 40 to produce pellets 45 of the blend. The pellets may then be processed into various articles. Blends of PEO and PVOH and blends of grafted PEO and PVOH can be extruded into a film, fibers and other articles in a single step by a film die, spinplate or other extrusion process.

The PVOH pellets used in Example 1 were produced following the same procedure as the PEO/PVOH blends, but the resin was fed alone into the extruder at 20 lb/hr. These pellets were used to produce a Comparative Example of pure PVOH without the addition of any plasticizers. The melt blends of the examples were pelletized into solid cylindrical pellets prior to attempts at film production from the blend. However, films can be processed directly from a melt blend in a one-step process, desirably a one-step extrusion process.

EXAMPLE 1

The particular PVOH resin used to manufacture a film in this example was obtained from Nippon Gohsei of Osaka, Japan and is sold under the trade designation Gohsenol KP-06. KP-06 PVOH resin is a desirable PVOH resin because it is both cold water-soluble and thermoplastic. KP-06 PVOH has a degree of hydrolysis of about 71%–74% and has a measured viscosity of 5–7 centipoise at 20° C. in a 4 percent aqueous solution as determined by the Hoeppler falling ball method.

A film was processed from the KP-06 PVOH resin without adding any additional additives, plasticizers or other modifiers in the above described Haake extruder fitted with a four-inch film die. The die temperature was set at 180° C. and the melt temperature of the PVOH was about 195° C. The screw speed was set at about 134 revolutions per minute (rpm), but was varied slightly to adjust the thickness of the film produced thereby. The film can be made at very low thicknesses; e.g., as low as 0.2 mil (approximately 1/1000 of an inch). The film that was produced from the unmodified PVOH had excellent clarity and uniformity. The film appeared to be very strong but allowed very little elongation. A film sample of 1.0 mil thickness was collected and used for tests of tensile properties.

EXAMPLE 2

The PVOH resin used to manufacture a film in this example was the same KP-06 PVOH resin as described in Example 1 above. However, 3 parts of PEO resin were added to 7 parts of PVOH resin and melt blended on a Haake twin screw extruder to form a melt blend. The PEO resin used in this Example was POLYOX® N-3000 PEO resin obtained form Union Carbide. The PEO resin was not modified as described in the above-incorporated patent applications and no additives or plasticizers were incorporated into the blend or the PEO or PVOH resins prior to or during blending. The melt blend was pelletized into solid cylindrical pellets prior to attempts at film production from the blend. However, films can be processed directly from a melt blend in one step.

A film was produced from the blend with the same equipment and under the same conditions as described for Example 1. The film produced form the blend contained a significant amount of gel particles. Because of the formation of gel particles and the poor compatibility between the PEO and PVOH, a film could not be drawn down as thin as with PVOH alone as illustrated in Example 1 above. The blend had poor melt processability. The film produced from the blend of this Example did feel somewhat softer, but appeared to be much weaker than the PVOH film of Example 1. The film from this Example was hazy, not transparent to light, and grainy. At low thickness, the weak melt strength and the formation of gel particles in the blend caused splitting and holes in the film. A film sample with a thickness of 1.3 mil was collected and used for tests of tensile properties.

EXAMPLE 3

A melt blend was formed in this Example using the same starting resins and same relative amounts of PVOH and PEO resin as Example 2 above. However, the PEO resin was grafted prior to melt blending with the PVOH resin. The PEO resin was grafted by reacting POLYOX® N-3000 PEO resin with 3.3 weight percent HEMA as the polar, vinyl monomer and 0.16 weight percent LUPERSOL® 101 initiator, relative to the amount of PEO resin. The grafting was performed under the conditions described above and disclosed in greater detail in co-pending U.S. patent application Ser. Nos. 09/001,831 and 09/002,197. HEMA is a polar vinyl monomer that is desirable for grafting. The melt blend was pelletized into solid cylindrical pellets prior to attempts at film production from the blend. Films can be processed directly from a melt blend in one step.

A film was processed from a melt blend of 30 weight percent grafted-PEO and 70 weight percent of PVOH using the same equipment and conditions in Examples 1 and 2 above. The grafted-PEO and PVOH blend film showed much improved film processability compared to the ungrafted-PEO and PVOH blend. The film processability of the grafted-PEO containing blend was nearly as good as the processability of PVOH alone. Films produced from the grafted-PEO containing blend were very clear and transparent to light. The films contained no visible gel particles. Films from the grafted blend could be drawn down as thin as the PVOH films and appeared to maintain the high strength observed for PVOH films. The grafted-PEO/PVOH blend tends to have improved melt processability. Additionally, the grafted-PEO/PVOH films had excellent melt strength and did not break or split at even the lowest thickness. This is a great improvement over unmodified PEO and PVOH blends as demonstrated in Example 2 above. A film of 1.2 mil was collected and used for tensile testing.

Tensile Properties

The tensile properties of a film of each of the three examples were measured. Following the observation of the properties of the polymer blends of PEO/PVOH and grafted-PEO/PVOH, the tensile properties of the films were tested so that they could be compared to PVOH films. Table 1 below shows a comparison between films produced from: Example 1, KP-06 PVOH resin; Example 2, a 30/70 weight percent melt blend of ungrafted POLYOX® N-3000 PEO and KP-06 PVOH resin; and Example 3, a 30/70 weight percent melt blend of HEMA grafted POLYOX N-3000 PEO resin and KP06 PVOH resin, respectively. A comparison of the mechanical properties of PVOH, a 70/30 weight PVOH/PEO blend and a 70/30 weight PVOH/grafted-PEO blend are presented in Table 1 below.

TABLE 1

| Property | Example 1 PVOH | Example 2 30% PEO 70% PVOH | Example 3 30% g-PEO 70% PVOH |
|---|---|---|---|
| Thickness (mil) | 1.0 | 1.3 | 1.2 |
| Percent Strain-to Break | 65 | 53 | 74 |
| Peak Stress (MPa) | 113.6 | 52.9 | 87.6 |
| Energy-to-Break (Inch-pounds) | 1.25 | 0.67 | 1.37 |
| Modulus (MPa) | 2300 | 870 | 1900 |

Poor blend compatibility and gel defects expectedly resulted in weaker tensile properties for the unmodified PEO/PVOH film of Example 2. The dramatic reduction in modulus for the unmodified PEO/PVOH film of Example 2 is more representative of weak tensile properties and defective film, rather than an improvement in softness. The film of Example 3, formed from a grafted-PEO/PVOH blend, showed an improvement in percent strain-to-break, a measure of ductility, and energy-to-break, a measure of toughness, while retaining very high strength compared to Example 2, a film formed from an ungrafted-PEO/PVOH blend of the same percentages of PEO and PVOH. The film of Example 3 exhibited a 39 percent increase in strain-to-break, from 35% to 74%. The peak stress of the film of the grafted-PEO/PVOH blend of Example 3 increased relative to the peak stress of the film of ungrafted-PEO/PVOH blend of Example 2. Specifically, grafting of the PEO component in the 30/70 PEO/PVOH blend increased the peak stress from 52.9 MPa to 87.6 MPa, an increase of about 65 percent. The reduction in modulus for the grafted-PEO/PVOH film of Example 3 compared to the PVOH film of Example 1 is evidence of the increased softness and increased flexibility of films comprising PVOH blended with grafted-PEO.

The comparison of the tensile properties of PVOH film to grafted-PEO/PVOH film shows potential for improving the ductility of PVOH films, while retaining water-solubility and high strength. The comparison between tensile properties of the unmodified PEO/PVOH of Example 2 and grafted-PEO/PVOH of Example 3 film demonstrates the remarkable improvement in compatibility between the polymer components, which is desired for film processability and visual and tactile properties, as well.

Blend Morphology

Figure 2:
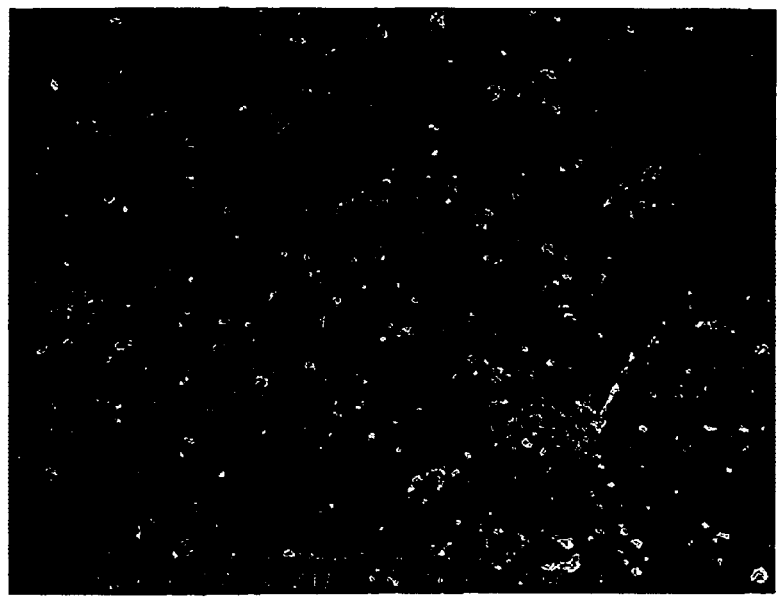
FIG. 2 is a SEM secondary electron image showing the surface topology of a film of a blend of 70 weight percent PVOH and 30 weight percent PEO at a 230× magnification (Example 2).
Figure 3:
FIG. 3 is a SEM back-scattered electron image showing the surface composition of a film of a blend of 70 weight percent PVOH and 30 weight percent PEO at a 230× magnification (Example 2).
Figure 4:
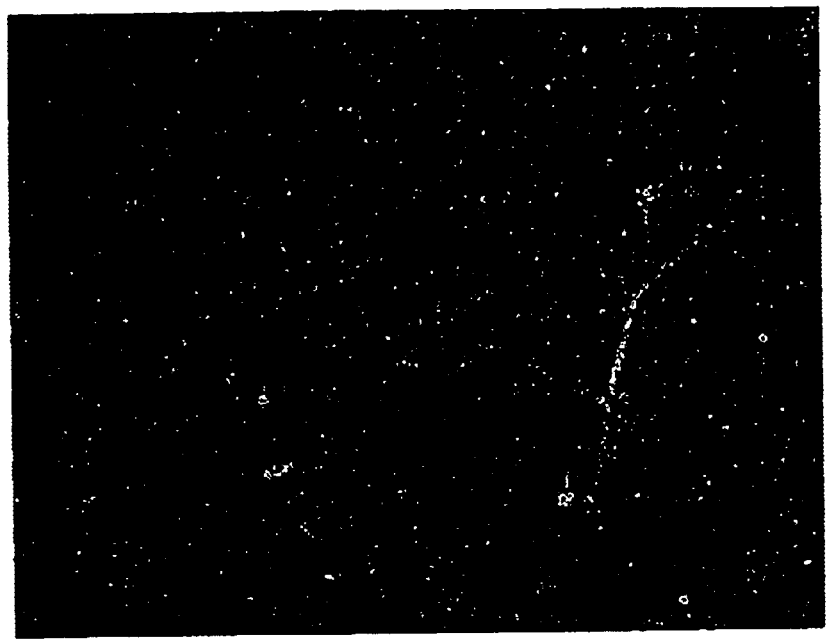
FIG. 4 is a SEM secondary electron image showing the surface topology of a film of a blend of 70 weight percent PVOH and 30 weight percent PEO grafted with 3.3 weight percent HEMA at 230× magnification (Example 3).
Figure 5:
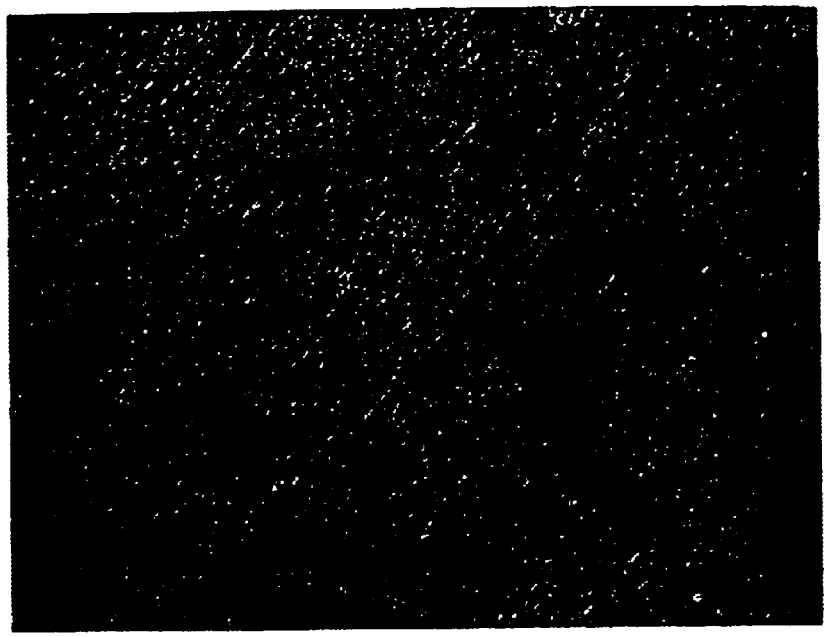
FIG. 5 is a SEM back-scattered electron image showing the surface composition of a film of a blend of 70 weight percent PVOH and 30 weight percent PEO grafted with 3.3 weight percent HEMA at 230× magnification (Example 3).

FIG. 2 is a scanning electron microscopy (SEM) surface topological image of a film of a 70/30 weight percent blend of PVOH/PEO at 230× magnification (Example 2). The image was made after osmication. Osmication is a process of vapor staining using osmium tetraoxide. See *Polymer Microscopy*, Chapter 4, "Sample Preparation Methods," Sawyer Grubb, Chapman & Hall, London (1987, p.25). FIG. 3 is a back-scattered electron image showing the surface composition of a film of a 70/30 weight percent blend of PVOH/PEO at the same magnification (Example 2). FIG. 4 is a secondary SEM image showing surface topology of a film of 70 weight percent PVOH and 30 weight percent PEO grafted with 3.3 weight percent HEMA at the same magnification (Example 3). FIG. 5 is a SEM back-scattered electron image showing surface composition composite of a film of 70 weight percent PVOH and 30 weight percent PEO grafted with 3.3 weight percent HEMA at the same magnification (Example 3).

In FIGS. 2 and 3, the phase separated morphology of unmodified PEO and PVOH blend can be observed. The dispersed PEO phases are large and non-uniform. In FIGS. 4 and 5, the blend morphology of grafted-PEO and PVOH shows significantly improved compatibility. The dispersed grafted-PEO phase shows reduced domain size and more uniformity than the unmodified PEO/PVOH film. The observed blend morphology of the polymer components in the unmodified PEO/PVOH and grafted-PEO/PVOH films confirms the improvement in compatibility and is also indirectly shown by improved film processability, visual and tactile properties, and tensile properties.

The comparison of mechanical properties; e.g., tensile properties, between Example 1 and Example 3 shows potential for improving the ductility of water-responsive films comprising PVOH by blending the PVOH with grafted-PEO. PVOH films become more ductile by blending with grafted-PEO while retaining their water solubility and high strength. Compositions and methods of the present invention are useful for making flushable films, fibers and other articles and can also be used in the manufacture of water-responsive and degradable films, fibers and articles. Suggested articles include personal care articles, such as pantiliners, diapers, tampons, training pants, adult incontinence products, etc., and health care articles, such as surgical gowns and masks, wound dressing, bandages, etc.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the Detailed Description and Examples are meant to be illustrative and are not meant to limit in any manner the scope of the invention as set forth in the following claims. Rather, the claims appended hereto are to be construed broadly within the scope and spirit of the invention.

What is claimed is:

1. A composition comprising a blend of a poly(vinyl alcohol) and a graft copolymer of poly(ethylene oxide), the blend having improved melt processability and mechanical properties without the addition of plasticizers; and
   wherein the graft copolymer of poly(ethylene oxide) comprises a poly(ethylene oxide) backbone main chain, and one or more chains derived from one or more monomers that differ chemically or configurationally from the poly(ethylene oxide) backbone, and wherein the one or more chains are bonded at one or more points along the poly(ethylene oxide) backbone, and
   wherein the graft copolymer of poly(ethylene oxide) is prepared from poly(ethylene oxide) resins having a weight average molecular weight from about 100,000 g/mol to about 8,000,000 g/mol.

2. The composition of claim 1, wherein the one or more monomers comprise one or more vinyl monomers.

3. The composition of claim 1, wherein the one or more monomers comprise one or more polar vinyl monomers.

4. The composition of claim 3, wherein the one or more polar vinyl monomers are selected from the group consisting of 2-hydroxyethyl methacrylate, poly(ethylene glycol) methacrylates, poly(ethylene glycol) ethyl ether methacrylates, poly(ethylene glycol) acrylates, poly(ethylene glycol) ethyl ether acrylate, poly(ethylene glycol) methacrylates with terminal hydroxyl groups, acrylic acid, maleic anhydride, itaconic acid, sodium acrylate, 3-hydroxypropyl methacrylate, acrylamide, glycidyl methacrylate, 2-bromoethyl acrylate, carboxyethyl acrylate, methacrylic acid, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) methacrylate, poly(propylene glycol) acrylate, 2-propene-1-sulfonic acid and its sodium salt, sulfo ethyl methacrylate, 3-sulfopropyl methacrylate, and 3-sulfopropyl acrylate.

5. The composition of claim 1, wherein the graft copolymer of poly(ethylene oxide) comprises from about 1 to about 30 weight percent of a polar vinyl monomer, a polar vinyl oligomer or a combination thereof, relative to the weight of the polyethylene oxide.

6. The composition of claim 1, wherein the one or more monomers comprise one or more hydroxyalkyl esters of methacrylic acid.

7. The composition of claim 1, wherein the one or more monomers comprise 2-hydroxyethyl methacrylate.

8. The composition of claim 1, wherein the graft copolymer of poly(ethylene oxide) is thermoplastic and water soluble, and wherein the poly(vinyl alcohol) is thermoplastic and water soluble, and wherein the composition is thermoplastic and water-soluble without the addition of plasticizers.

9. The composition of claim 1, wherein the blend comprises, based on the total weight of the graft copolymer of poly(ethylene oxide) and the poly(vinyl alcohol), from about 1 weight percent to about 99 weight percent of the graft copolymer of poly(ethylene oxide) and from about 1 weight percent to about 99 weight percent of poly(vinyl alcohol).

10. The composition of claim 1, wherein the blend comprises, based on the total weight of the graft copolymer of poly(ethylene oxide) and the poly(vinyl alcohol), from about 10 weight percent to about 90 weight percent of the graft copolymer of poly(ethylene oxide) and from about 10 weight percent to about 90 weight percent of poly(vinyl alcohol).

11. The composition of claim 1, wherein the blend comprises, based on the total weight of the graft copolymer of poly(ethylene oxide) and the poly(vinyl alcohol), from about 10 weight percent to about 50 weight percent of the graft copolymer of poly(ethylene oxide) and from about 50 weight percent to about 90 weight percent of poly(vinyl alcohol).

12. A thermoplastic, water-soluble composition comprising a blend of a poly(vinyl alcohol) and a graft copolymer of poly(ethylene oxide);

wherein the graft copolymer of poly(ethylene oxide) comprises a poly(ethylene oxide) backbone main chain, and one or more chains derived from one or more monomers that differ chemically or configurationally from the poly(ethylene oxide) backbone, and wherein the one or more chains are bonded at one or more points along the poly(ethylene oxide) backbone, and wherein the graft copolymer of poly(ethylene oxide) is prepared from poly(ethylene oxide) resins having a weight average molecular weight from about 100,000 g/mol to about 8,000,000 g/mol.

13. The composition of claim 12, wherein the one or more monomers comprise one or more vinyl monomers.

14. The composition of claim 12, wherein the one or more monomers comprise one or more polar vinyl monomers.

15. The composition of claim 12, wherein the one or more monomers comprise one or more polar vinyl monomers selected from the group consisting of 2-hydroxyethyl methacrylate, poly(ethylene glycol) methacrylates, poly(ethylene glycol) ethyl ether methacrylates, poly(ethylene glycol) acrylates, poly(ethylene glycol) ethyl ether acrylate, poly(ethylene glycol) methacrylates with terminal hydroxyl groups, acrylic acid, maleic anhydride, itaconic acid, sodium acrylate, 3-hydroxypropyl methacrylate, acrylamide, glycidyl methacrylate, 2-bromoethyl acrylate. carboxyethyl acrylate, methacrylic acid, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) methacrylate, poly(propylene glycol) acrylate, 2-propene-1-sulfonic acid and its sodium salt, sulfo ethyl methacrylate, 3-sulfopropyl methacrylate, and 3-sulfopropyl acrylate.

16. The composition of claim 12, wherein the graft copolymer of poly(ethylene oxide) comprises from about 1 to about 30 weight percent of polar vinyl monomer, polar vinyl oligomer or a combination thereof, relative to the weight of the poly(ethylene oxide).

17. The composition of claim 12, wherein the one or more monomers comprise one or more hydroxyalkyl esters of methacrylic add.

18. The composition of claim 12, wherein the one or more monomers comprise 2-hydroxyethyl methacrylate.

19. The composition of claim 12, wherein the graft copolymer of poly(ethylene oxide) is thermoplastic and water-soluble, and wherein the poly(vinyl alcohol) is thermoplastic and water soluble.

20. The composition of claim 12, wherein the blend comprises, based on the total weight of the graft copolymer of poly(ethylene oxide) and the poly(vinyl alcohol), from about 1 weight percent to about 99 weight percent of the graft copolymer of poly(ethylene oxide) and from about 1 weight percent to about 99 weight percent of the poly(vinyl alcohol).

21. The composition of claim 12, wherein the blend comprises, based on the total weight of the graft copolymer of poly(ethylene oxide) and the poly(vinyl alcohol), from about 10 weight percent to about 90 weight percent of the graft copolymer of poly(ethylene oxide) and from about 10 weight percent to about 90 weight percent of the poly(vinyl alcohol).

22. The composition of claim 12, wherein the blend comprises, based on the total weight of the graft copolymer of poly(ethylene oxide) and the poly(vinyl alcohol), from about 10 weight percent to about 50 weight percent of the graft copolymer of poly(ethylene oxide) and from about 50 weight percent to about 90 weight percent of the poly(vinyl alcohol).

23. A thermoplastic, water-soluble composition consisting essentially of a blend of a poly(vinyl alcohol) and a graft copolymer of poly(ethylene oxide);

wherein the graft copolymer of poly(ethylene oxide) comprises a poly(ethylene oxide) backbone main chain, and one or more chains derived from one or more monomers that differ chemically or configurationally from the poly(ethylene oxide) backbone, and wherein the one or more chains are bonded at one or more points along the poly(ethylene oxide) backbone, and wherein the graft copolymer of poly(ethylene oxide) is prepared from poly(ethylene oxide) resins having a weight average molecular weight from about 100,000 g/mol to about 8,000,000 g/mol.

24. The composition of claim 23, wherein the one or more monomers comprise one or more polar vinyl monomers.

25. The composition of claim 23, wherein the one or more monomers comprise one or more hydroxyalkyl esters of methacrylic acid.

26. A film comprising the composition of claim 1.

27. A fiber comprising the composition of claim 1.

28. An article comprising the composition of claim 1.

29. A personal care article comprising the composition of claim 1.

30. The article of claim 29, wherein the personal care article is a diaper.

31. The article of claim 29, wherein the personal care article is a pantiliner.

* * * * *